(12) United States Patent
Khonsari et al.

(10) Patent No.: US 7,252,291 B2
(45) Date of Patent: *Aug. 7, 2007

(54) MECHANICAL SEAL HAVING A SINGLE-PIECE, PERFORATED MATING RING

(75) Inventors: Michael M. Khonsari, Baton Rouge, LA (US); Anoop K. Somanchi, Fremont, CA (US)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/987,352

(22) Filed: Nov. 12, 2004

(65) Prior Publication Data

US 2006/0103073 A1    May 18, 2006

(51) Int. Cl.
*F16J 15/34* (2006.01)
*F28D 11/00* (2006.01)
*F28F 7/00* (2006.01)

(52) U.S. Cl. ............... 277/360; 277/401; 277/408; 165/86; 165/185

(58) Field of Classification Search ........ 277/358–360, 277/370, 408
See application file for complete search history.

(56) References Cited

U.S. PATENT DOCUMENTS

| 822,802 | A | * | 6/1906 | Ballard | 277/427 |
|---|---|---|---|---|---|
| 2,858,149 | A | * | 10/1958 | Laser | 277/360 |
| 3,804,424 | A | * | 4/1974 | Gardner | 277/360 |
| 3,861,503 | A | * | 1/1975 | Nash | 188/276 |
| 3,970,320 | A | * | 7/1976 | Wiese | 277/359 |
| 4,005,747 | A | | 2/1977 | Ball | 165/134 |
| 4,082,297 | A | * | 4/1978 | Adams | 277/348 |
| 4,123,069 | A | | 10/1978 | Sato | 277/391 |
| 4,272,084 | A | * | 6/1981 | Martinson et al. | 277/365 |
| 4,298,205 | A | * | 11/1981 | Ostling | 277/360 |
| 4,361,334 | A | | 11/1982 | Amorese et al. | 277/16 |
| 4,365,815 | A | | 12/1982 | Scott | 277/22 |
| 4,685,684 | A | * | 8/1987 | Ballard | 277/416 |
| 5,203,575 | A | * | 4/1993 | Azibert et al. | 277/348 |
| 5,344,163 | A | * | 9/1994 | Roll et al. | 277/424 |

(Continued)

FOREIGN PATENT DOCUMENTS

JP    58146770    9/1983

(Continued)

*Primary Examiner*—Patricia Engle
*Assistant Examiner*—Jonathan Liu
(74) *Attorney, Agent, or Firm*—John H. Runnels; Bonnie J. Davis

(57) ABSTRACT

A mechanical seal (e.g., single mechanical seals, double mechanical seals, tandem mechanical seals, bellows, pusher mechanical seals, and all types of rotating and reciprocating machines) with reduced contact surface temperature, reduced contact surface wear, or increased life span. The mechanical seal comprises a rotating ring and a single-piece, perforated mating ring, which improves heat transfer by controllably channeling coolant flow through the single-piece mating ring such that the coolant is in substantially uniform thermal contact with a substantial portion of the interior surface area of the seal face, while maintaining the structural integrity of the mechanical seal and minimizing the potential for coolant flow interruptions to the seal face caused by debris or contaminants (e.g., small solids and trash) in the coolant.

6 Claims, 6 Drawing Sheets

U.S. PATENT DOCUMENTS

| | | | | |
|---|---|---|---|---|
| 5,468,002 A | * | 11/1995 | Wasser | 277/361 |
| 5,593,165 A | | 1/1997 | Murray et al. | 277/22 |
| 6,149,160 A | | 11/2000 | Stephens et al. | 277/399 |
| 6,280,090 B1 | | 8/2001 | Stephens et al. | 384/284 |
| 6,942,219 B2 | * | 9/2005 | Khonsari et al. | 277/360 |
| 2004/0026871 A1 | | 2/2004 | Stephens et al. | 277/401 |
| 2004/0201175 A1 | * | 10/2004 | Buchmann et al. | 277/358 |
| 2005/0082765 A1 | * | 4/2005 | Khonsari et al. | 277/359 |

FOREIGN PATENT DOCUMENTS

| | | |
|---|---|---|
| JP | 59194171 | 11/1984 |
| JP | 60037462 | 2/1985 |
| JP | 2003074713 | 3/2003 |

* cited by examiner

MECHANICAL SEAL HAVING A SINGLE-PIECE, PERFORATED MATING RING

The development of this invention was partially funded by the Government under grant number DE-FG48-02R810707, from the United States Department of Energy. The Government has certain rights in this invention.

This invention pertains to mechanical seals (e.g., single mechanical seals, double mechanical seals, tandem mechanical seals, bellows, pusher mechanical seals, and all types of rotating and reciprocating machines) with reduced contact surface temperature, reduced contact surface wear, or increased life span.

A mechanical seal is a device that inhibits leakage of a lubricant or a process fluid contained in a mechanical system. Mechanical seals typically comprise a rotating (primary) ring and a mating ring (stationary ring) having contact surfaces that slide against each other to form a seal between a rotating shaft and a mechanical housing structure. In most applications, the rotating ring is affixed to a rotary shaft, while the mating ring is installed in a gland (i.e., a device which holds the stationary ring in a cavity within the mechanical housing structure and connects it to a chamber surrounding the seal) that is adapted to abut the rotating ring. The rotating ring is typically pressed against the stationary ring either by a spring or a bellows system; typically, an elastomer or a metallic component is used as a dynamic sealing element to minimize leakage between the rotating ring and the stationary ring by exerting a constant force against the rotating ring so that it stays in contact with the mating ring.

A common cause for failure of a mechanical seal is excessive wear, which often occurs when the mechanical seal becomes unbalanced. If the seal is unbalanced, spring pressure and fluid pressure may cause an increase in pressure between the contact surfaces of the rotating and mating rings, resulting in excessive wear and heat. Excessive heat and associated problems such as temperature and pressure gradients at the contact surface may lead to thermoelastic instability, causing hot spots on the contact surface of the mating ring, seal blistering, heat checking, and seal face cracking. These problems often result in excessive leakage and premature seal failure.

Another cause for failure of a mechanical seal is clogging, which can occur when micro-scale heat exchangers are used to cool the seal. Mechanical seals often operate in plant environments and are exposed to debris, and contamination such as rust, scale, and dirt in the cooling fluids (e.g., water and air) used to remove heat from the seal. Mechanical seal designs incorporating micro-scale heat exchangers are susceptible to clogging. As with other heat exchangers, contamination fouling becomes an important drawback in the effectiveness of heat transfer in mechanical seals, particularly those with an internal heat exchanger. The use of ultra-fine filters for blocking dirt influx is often not an acceptable solution, because of the tendency of the filter itself to clog and the high maintenance costs associated with monitoring and replacing filters. The increase in the pressure gradient across the filter may further contribute to power loss.

Mechanical seal designs incorporating micro-scale heat exchangers such as micro-sized fins and posts are also susceptible to premature failure caused by various loads such as torque and compression. For example, if the height or edge-to-edge spacing between adjacent micro-sized cooling fins or posts is too high, a sharp increase in torque, particularly at start-up when the coefficient of friction between the mating ring and rotating ring is at its highest value, could break the cooling fins and posts.

U.S. Pat. Application Ser. No. 2004/0026871A1 describes a device for providing heat transfer in bearings, seals, and other devices comprising a seal ring having a micro heat exchanger, a gland plate for securing the seal ring to a machinery housing (e.g., a pump housing), a heat sink cover plate, and a backing ring. In one embodiment, the gland plate comprises a first cooling fluid port in communication with the micro heat exchanger, an annular groove, and a group of cooling fluid distribution and collection ports in communication with the annular groove and the micro heat exchanger. The heat exchanger comprises a plurality of cooling fins attached to the heat sink cover plate, wherein each of the plurality of cooling fins has a cross-sectional dimension of between about 10-1000 microns, and an edge-to-edge spacing between adjacent cooling fins of about 100-1000 microns. The plurality of cooling fins may have a cross-section shape selected from the group consisting of round, elliptical, polygonal, triangular, rectangular, square, hexagonal, star-shaped, pentagonal, trapezoidal, octagonal and mixtures thereof.

Japanese Patent Abstract Publication No. 2003074713 describes a device for reducing the sliding heat of a mechanical seal, comprising a seal ring and a seal face by passing a fluid between a shaft and the seal ring to the inner peripheral side of the seal face.

U.S. Pat. Nos. 6,149,160 and 6,280,090 describe a device and method for improving heat transfer capability and lubricant flow of mechanical bearings and seals (e.g., ball bearings, roller bearings, journal bearings, air bearings, magnetic bearings, single mechanical seals, double mechanical seals, tandem mechanical seals, pusher mechanical seals, and bellows). The load-bearing surfaces of the bearings and seals are covered with large fields of high aspect ratio microstructures, such as microchannels or microposts.

U.S. Pat. No. 4,365,815 describes a device and method for cooling the working face of mechanical working elements such as bearings, rotary seals, and friction devices comprising two sealing members, each having a sealing face, mounted on a rotatable shaft, wherein at least one of the sealing members has a cavity with interconnecting pores that receive a cooling fluid to remove heat generated between the sealing faces.

U.S. Pat. No. 5,593,165 describes a device for providing heat transfer in seal systems for gas turbine engines comprising a mechanical housing, a shaft rotatably mounted within the housing, a first sealing element coupled to the housing, and a second sealing element connected to the shaft, wherein the second sealing element is arranged adjacent to the first sealing element to form a rubbing interface there-between. The second sealing element additionally comprises a channel on the radially inward side for receiving cooling fluid and allowing the fluid to escape at a plurality of points along its length. The shaft additionally comprises a passageway for delivering cooling fluid to the channel for cooling the second sealing element.

Japanese Patent Abstract Publication No. 60037462 describes a device and method to improve the cooling efficiency of a mechanical seal comprising an inner and outer fixed ring by passing cooling water through a passage between the fixed rings.

Japanese Patent Abstract Publication No. 59194171 describes a device and method to remove sliding heat generated in a mechanical seal comprising a casing and two sealing members by injecting a sealing liquid onto one the sealing members.

Japanese Patent Abstract Publication No. 58146770 describes a device and method to remove frictional heat generated in a mechanical seal comprising a first and a second sealing ring, each having a sealing face, a casing, and a heat pipe having a first end arranged near the vicinity of the first sealing ring, and a second end exposed in a chamber, by allowing frictional heat generated at the sealing end faces to be transmitted by the heat pipe from the first sealing ring to the chamber.

U.S. Pat. No. 4,123,069 describes a device for mechanically sealing a rotary shaft extending through stationary casings, comprising a rotatable ring fixed to the rotary shaft, a first stationary ring surrounding the rotary shaft and affixed to one of the casings, and a second stationary ring surrounding the rotary shaft and adapted to engage the rotatable ring. The rotatable ring comprises a plurality of radial passages for receiving a cooling medium to remove frictional heat generated between the rotatable ring and the second stationary ring.

U.S. Pat. No. 4,361,334 describes a stationary seal seat for reducing the operating temperature of a rotating mechanical seal comprising an annular ceramic ring insert disposed within a metal ring, and a glass coating between the ceramic insert and metal ring for fusing the two together. The ceramic insert additionally comprises an annular passage that extends around the insert at the interface between the insert and the metal ring, and ports which extend through the metal ring to allow coolant to flow between the ceramic insert and the metal ring.

U.S. Pat. No. 4,005,747 describes a heat exchanger and method for cooling a mechanical seal assembly affixed around a pump shaft. The heat exchanger comprises at least two cylindrical housing members having a plurality of grooves and slots surrounding the shaft to permit the flow of hot fluid from the pump to the heat exchanger, and cool fluid from the heat exchanger to flow back through the grooves and slots.

An unfilled need exists for mechanical seals (e.g., single mechanical seals, double mechanical seals, tandem mechanical seals, bellows, pusher mechanical seals, and all types of rotating and reciprocating machines) with reduced contact surface temperature, reduced contact surface wear, or increased life span.

We have discovered a mechanical seal (e.g., single mechanical seals, double mechanical seals, tandem mechanical seals, bellows, pusher mechanical seals, and all types of rotating and reciprocating machines) with reduced contact surface temperature, reduced contact surface wear, or increased life span. The novel apparatus improves heat transfer by controllably channeling coolant flow through a single-piece mating ring such that the coolant is in substantially uniform thermal contact with a substantial portion of the interior surface area of the seal face, while maintaining the structural integrity of the mechanical seal and minimizing the potential for coolant flow interruptions to the seal face caused by debris or contaminants (e.g., small solids and trash) in the coolant. The apparatus is a mechanical seal (e.g., single mechanical seals, double mechanical seals, tandem mechanical seals, bellows, pusher mechanical seals, and all types of rotating and reciprocating machines) comprising a rotating ring and a single-piece, perforated mating ring having an outer circumferential flow-channel and through-channels (e.g., radial holes or radial slots).

In a preferred embodiment, the perforated mating ring allows for axial, circumferential, and radial removal of heat generated at the seal face and the surface of the mating ring that slides against the rotating ring, by uniformly channeling a coolant (e.g., air, nitrogen, water, ethylene glycol, propane, lube oil, etc.) entering the mating ring to a position adjacent to and in close proximity with the interior surface area of the mating ring to substantially reduce the surface temperatures on the seal face.

Unlike prior apparatuses and methods of reducing contact surface temperatures in mechanical seals by incorporating micro-scale heat exchangers (e.g., micro-sized fins and posts), the novel apparatus uses symmetrically-spaced channels extending from the outer circumferential flow-channel through the inner diameter of the ring to form through-channels that uniformly channel coolant in a direction perpendicular to the outer circumferential flow-channel to remove heat from the seal face where the mating ring and rotating ring make contact, and to minimize the potential of structural failure caused by forces such as torque and compression loads. (The highest surface temperatures generally occur in the inner diameter of the mating ring where the mating ring makes contact with the rotating ring.) The through-channels are sized and shaped to minimize the potential for coolant flow interruptions caused by debris or contaminants in the coolant, while maintaining the structural integrity of the mechanical seal.

Figure 1:
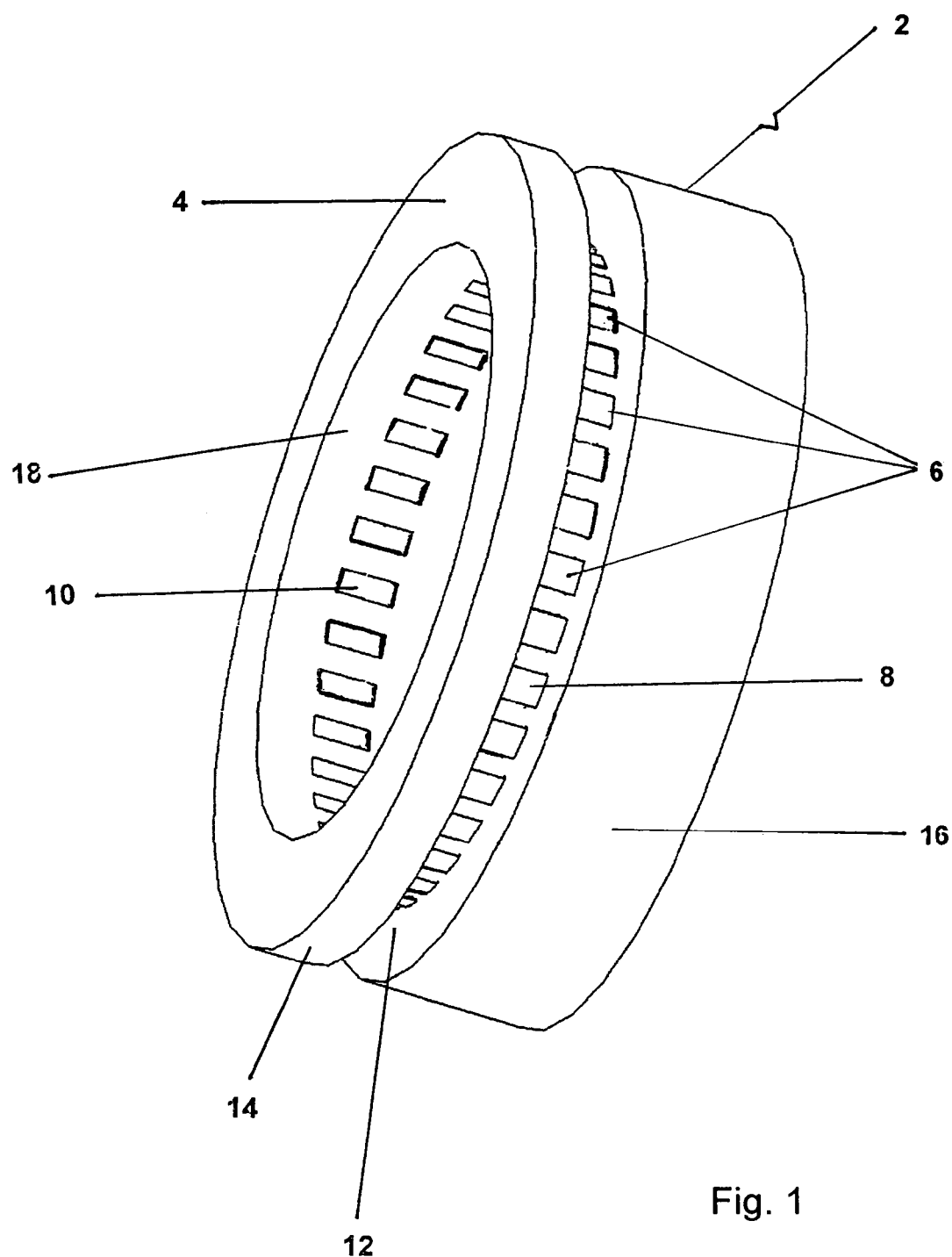
FIG. 1 is a side plan view of one embodiment of the mating ring.

A purpose of this invention is to provide a reliable, inexpensive mechanical seal (e.g., single mechanical seals, double mechanical seals, tandem mechanical seals, bellows, pusher mechanical seals, and all types of rotating and reciprocating machines) and all types of rotating and reciprocating machines) with reduced contact surface temperature, reduced contact surface wear, or increased life span. The basic design of the apparatus may, for example, be that of an otherwise conventional mechanical seal comprising a rotating ring and a mating ring. In one embodiment, the mating ring is formed from a single-piece ring having a seal face that abuts the rotating ring and an outer circumferential flow-channel. The outer circumferential flow-channel comprises a plurality of symmetrically-spaced through-channels sized and shaped (e.g., circular-shaped, rectangular-shaped, elliptical-shaped, or diamond-shaped) to allow coolant (e.g., air, nitrogen, water, ethylene glycol, propane, or lubricating oil liquid, gas, etc.) to flow through the mating ring in a direction perpendicular to the outer circumferential flow-channel, while minimizing problems associated with back pressure, clogging, and structural failure caused by mechanical loads such as torque and compression forces.

In a preferred embodiment, the width of the outer circumferential flow-channel is at least 20% the width of the mating ring. The symmetrically-spaced through-channels have a width slightly less than that of the outer circumferential flow-channel. To minimize the potential for coolant flow interruptions to the seal caused by debris contaminants contained in the coolant, the edge-to-edge spacing (along the outer circumferential flow-channel) between adjacent, symmetrically-spaced through-channels should be at least 0.06 in, and the minimum surface area of each through-channel should be at least 0.007 in$^2$.

The mechanical components should be capable of withstanding heat produced while the mechanical seal is operating, and should have relatively high mechanical strength and relatively high resistance to corrosion, friction, and wear, such as stainless steel, heat-treated 17-4 PH stainless steel, Ni-resist, stellite, titanium, ceramics (e.g., silicon carbide and silicon nitride), and graphite composites. Optionally, a thin protective coating capable of improving the mechanical and tribological properties (e.g., hardness, coefficient of friction, and rate of wear) of mechanical components may be conformally deposited onto the mechanical seal such as a Ti-containing hydrocarbon (Ti—C:H)). See, e.g., U.S. patent application Ser. No. 10/660, 926.

There are several advantages to the novel seal. The number of components is small. Fabrication is simple and inexpensive. The perforated mating ring does not require shrink-fitting or threading, nor does it require the fabrication of components having high tolerances. Unlike prior devices, the perforated mating ring has large (>0.007 in$^2$) radial holes or radial slots that minimize coolant flow interruptions (e.g., clogging and fouling of coolant passages) to mechanical seals caused by debris or contaminants contained in the coolant, which minimizes back pressure in the supply of coolant. The device allows for the pumping of high temperature process fluids, which typically contributes to the temperature increase at the interface of the rotating and mating rings. The perforated mating ring increases the service life and continuous operating times of a mechanical seal. By uniformly channeling the flow of coolant adjacent to the interior surface area of the seal face, heat is substantially removed from the contact surface because the coolant is in contact with a large portion of the mating ring body at all times, which helps to rapidly reduce the temperature at the seal face. Thus, the occurrences of hot spots, blistering, heat checking, seal face cracking, and excessive wear, which can ultimately cause premature seal failure, are minimized.

EXAMPLE 1

Figure 2:
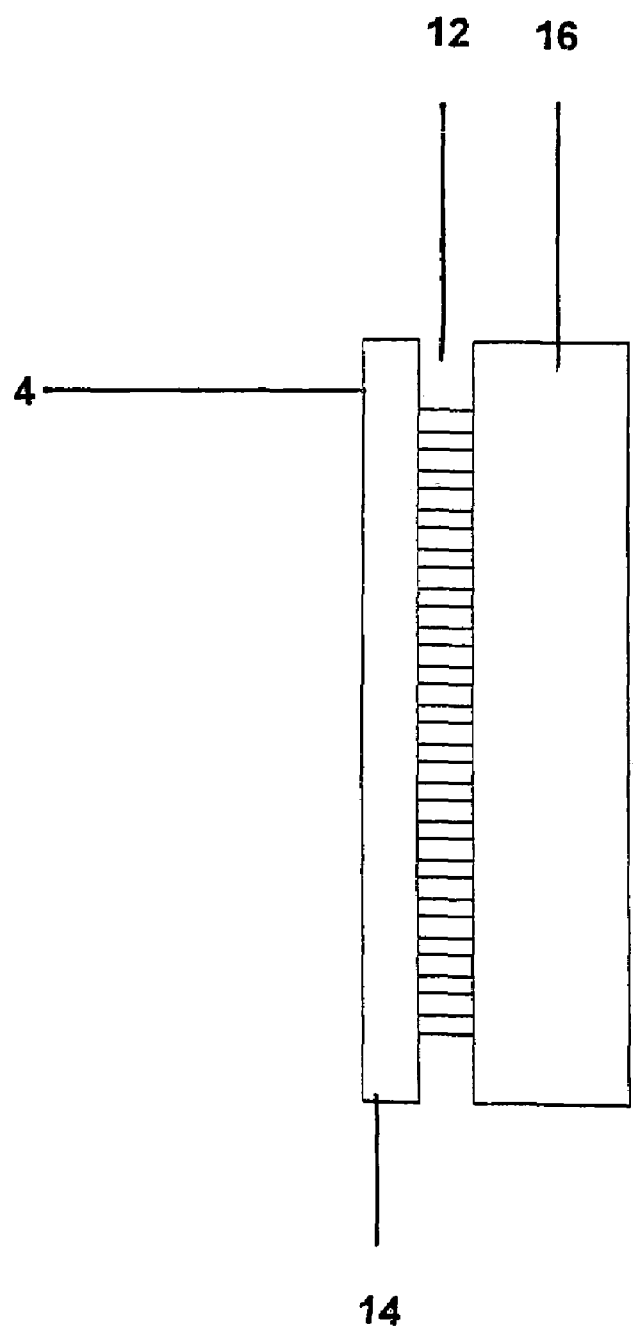
FIG. 2 is a perspective view of one embodiment of the mating ring.

FIG. 1 is a side plan view of one embodiment of a single-piece, perforated mating ring 2 in accordance with this invention. In this embodiment, the mating ring 2 comprises a seal face 4, a plurality of through-channels 6, each having an inlet port 8 and an outlet port 10, and an outer circumferential flow-channel 12 for uniformly dispersing coolant to through-channels 6. Mating ring 2 is circular and comprises an outer surface 16, an inner surface 18, and an outer circumferential flow-channel 12 machined into the surface of outer surface 16. See also FIG. 2.

In this embodiment, outer circumferential flow-channel 12 was sized and shaped to uniformly disperse coolant to through-channels 6 and to maintain the structural integrity of the mechanical seal by complimenting the size and thickness of cap 14. To maintain the structural integrity of the mechanical seal, the depth ("$D_{slot}$") of outer circumferential flow-channel 12 was calculated using the following formula:

$$D_{slot}=OD_{Rr}-ID_{Mr}$$

where $OD_{Rr}$ is the outer diameter of the rotating ring (not shown); and $ID_{Mr}$ is the inner diameter of mating ring 2. In a preferred embodiment, the thickness of outer circumferential flow-channel 12 was directly proportional to that of cap 14. The size and shape of through-channels 6 were adapted to direct coolant flowing through outer circumferential flow-channel 12 to a position adjacent to and in close proximity with the interior surface area of seal face 4 before exiting through outlet 10, while minimizing back pressure. In a preferred embodiment, through-channels 6 comprised sixteen slots symmetrically distributed along the outer and inner surfaces (16 and 18) to allow coolant to flow through mating ring 2, and to maintain sufficient heat transfer such that any thermoelastic instability was minimized. See FIG. 2. In an alternative embodiment, a plurality of through-channels 6 (e.g., eight, thirty-two, etc.) may be used to allow coolant to flow through mating ring 2. The size and shape (e.g., rectangular, elliptical, or diamond-shaped) of through-channels 6 may also be adapted to allow for an increased influx of coolant 14 entering mating ring 2.

EXAMPLE 2

Figure 3:
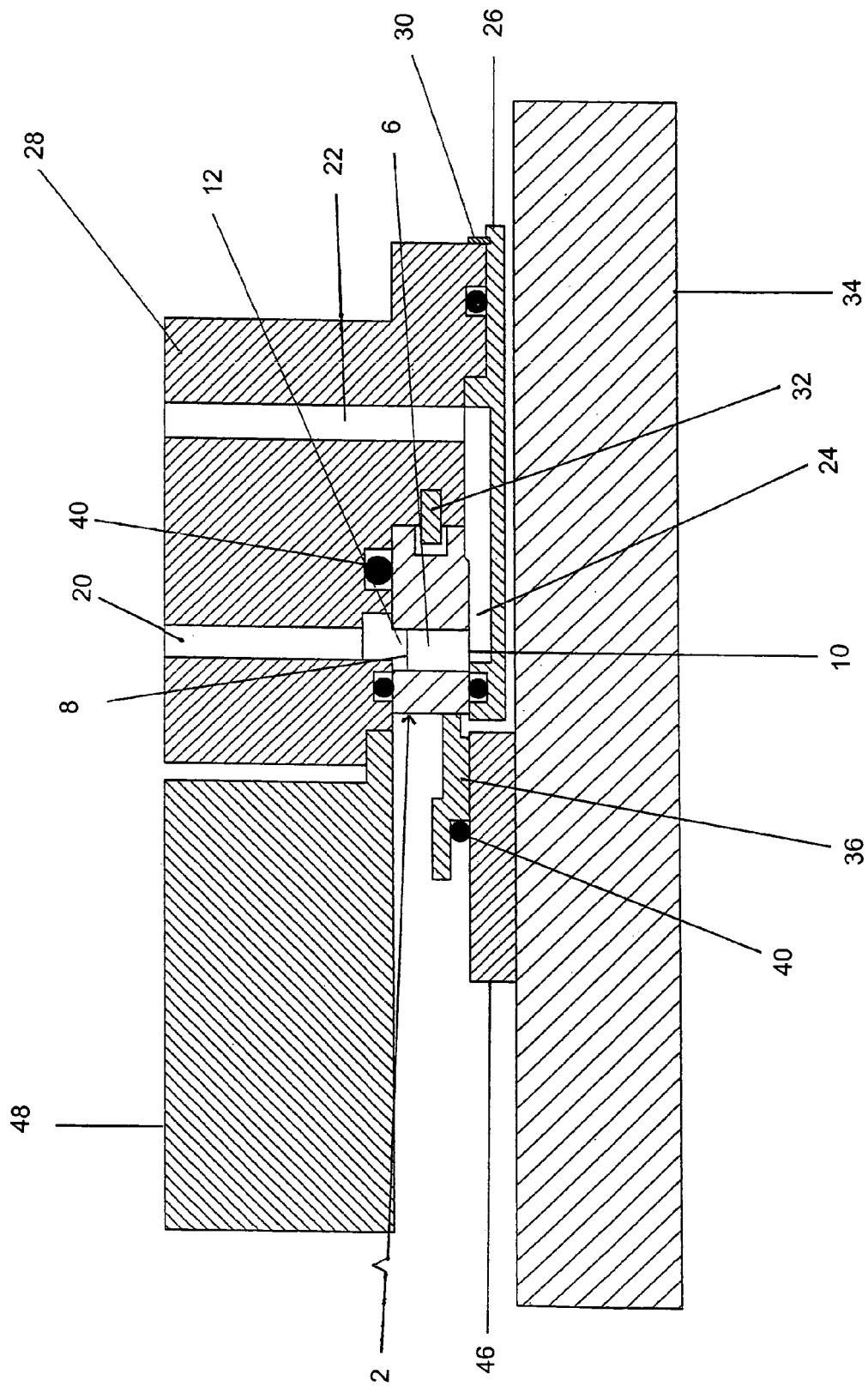
FIG. 3 is a cross-sectional, schematic diagram of some of the parts of a pump operating with one embodiment of the mechanical seal.

FIG. 3 is a sectional view of one embodiment of a mechanical seal used in a water pump (e.g., model #3196STX, ITT-Goulds Pumps, Albany, N.Y.) In this embodiment, mating ring 2 was constructed such that coolant flowed through outer circumferential flow-channel 12, entered inlet ports 8, and then flowed through through-channels 6 before exiting mating ring 2 through outlet ports 10. Coolant was supplied to inlet ports 8 through a supply channel 20 located in seal gland 28. As the coolant exited outlet ports 10, it flowed away from mating ring 2 through a routing port 24 located between sleeve 26 and mating ring 2. Sleeve 26 was held in close proximity with rotary shaft 34 using a snap ring 30. Mating ring 2 was securely affixed to seal gland 28 using an anti-rotation pin 32 which was adapted to prevent mating ring 2 from rotating. A plurality of rubber O-rings 40 were adapted for use as secondary sealing components to help prevent fluid from escaping seal gland 28. Rotating ring 36, located in a stuffing box 48, was adapted to form a seal with mating ring 2 using a seal head 46 which allowed rotating ring 36 to rotate with shaft 34. Exiting coolant was removed from mating ring 2 through exit channel 22 in seal gland 28. In one embodiment, when liquid (e.g., water) is used as the coolant, the flow loop is closed, allowing the coolant to exit channel 22 and return to supply channel 20 for recirculation in a continuous loop. Alternatively, when gas is used as the coolant, the flow loop may be left as an open loop, allowing the coolant to exit channel 22 and escape to the atmosphere.

EXAMPLE 3

Construction of Prototype

A prototype, single-piece, perforated mating ring 2 was made of 17-4 PH stainless steel. Mating ring 2 had an outside diameter of 2.165 in and an inside diameter of 1.587 in. A 0.15 in wide outer circumferential groove-channel 12 was machined around the outer diameter of the mating ring 2 at a distance of 0.15 in from the edge of seal face 4. Thirty six slots having a width of 0.125 in and a length of 0.0625 in were machined through outer circumferential groove-channel 12 at a distance of 0.15 in from the edge of seal face 4 to form inlet and outlet ports (8 and 10) in the outer and inner surfaces (16 and 18) of mating ring 2, respectively. The outer diameter of outer circumferential flow-channel 12 was 2.165 in and the inner diameter was 0.15 in.

A conventional rotating ring 36 having an outer diameter of 1.762 in and an inner diameter of 1.593 in was used to form a seal with mating ring 2. Rotating ring 36 was made from carbon graphite.

EXAMPLE 4

Uniform Heat Transfer Test

To confirm that the prototype mechanical seal was highly effective in uniformly removing heat generated at the contact surface between the mating ring 2 and rotating ring 36, comparison tests were conducted between a conventional mechanical seal and the prototype of Example 3. In separate tests, the outer circumferential channel 12 of the prototype was supplied with cooling water at room temperature through inlet port 20, and then at 43° F., while the conventional mechanical seal was run with a coolant at room temperature.

The test conducted with water at 43° F. demonstrated the effectiveness of the perforated mating ring as a heat exchanger for removing heat from the mating ring surface. To measure the contact surface temperature of each seal, two thermocouples (J-type; Gulf Sensors, Inc., Baton Rouge, La.) were placed in two 0.7375 in deep holes drilled into each mating ring at a 45° angle with the anti-rotation pin 32. (The slots were ~0.002 in from the contact surface of the mating rings.) A 16-channel thermocouple monitor (Model SR630; Stanford Research Systems, Sunnyvale, Calif.) was used to record the data from the thermocouples. To assess performance, the mechanical seals were then consecutively installed in a GOULDS® water pump (model # 3196STX; ITT-Goulds Pumps, Albany, N.Y.). Water was pumped into the circumferential channel 12 of each prototype mechanical seal at 1 gpm and 10 psi.

Figure 4:
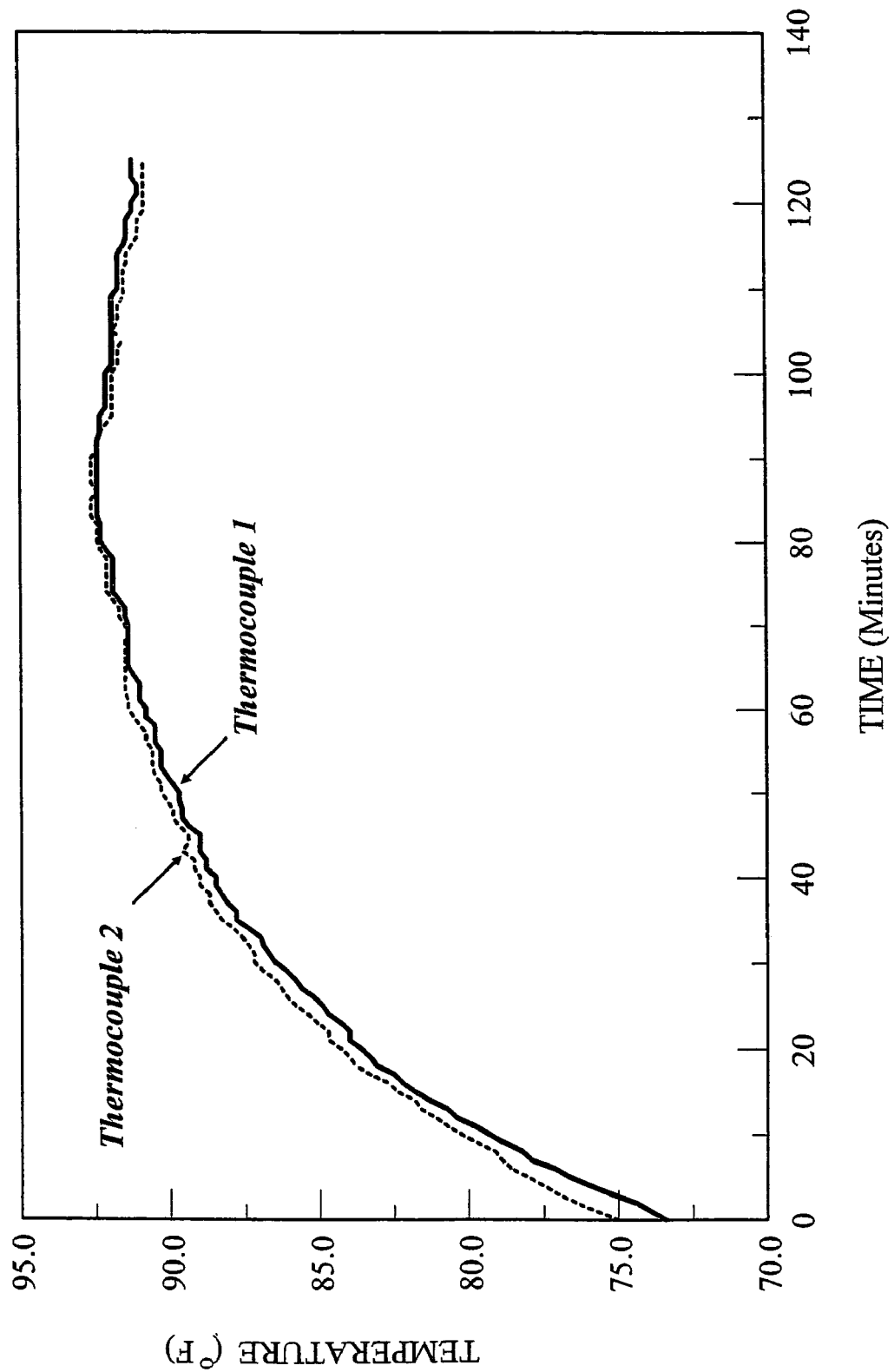
FIG. 4 is a graph plotting temperature measurements for one embodiment of the mating ring supplied with 1.0 gpm of water coolant at room temperature as a function of time.
Figure 5:
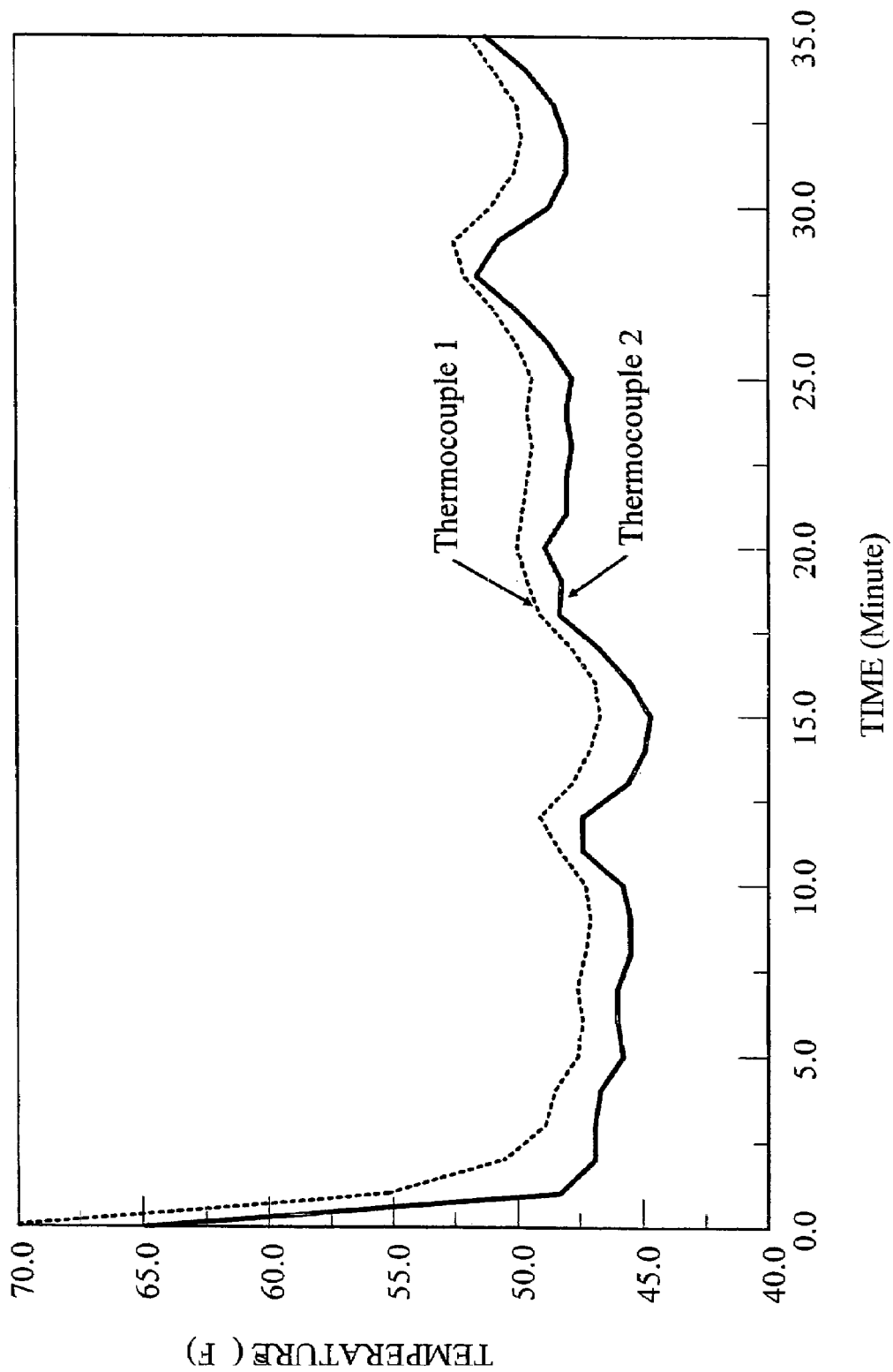
FIG. 5 is a graph plotting temperature measurements for one embodiment of the mating ring supplied with 1.0 gpm of water coolant at 0° C. (32° F.) as a function of time.

The first test measured the temperature at the contact surface of the prototype described in Example 3, when the circumferential channel 12 was supplied with cooling water at room temperature. The temperature at the contact surface of the mating ring 2, as measured by thermocouples "1" and "2," increased as shown in FIG. 4, until a steady state was reached at about 90-91° F. after approximately 90 min. When the circumferential channel 12 was supplied with water having a temperature of 43° F., the contact surface temperatures measured with thermocouples "1" and "2" rapidly decreased from about 70.0° F. to about 45° F., and from about 65.0° F. to about 47° F., respectively, after operating for approximately 5 min, as shown in FIG. 5. The test was continued for an additional 30 min, during which time the temperature measured by thermocouples "1" and "2" uniformly fluctuated between about 44° F. and about 55° F.

Figure 6:
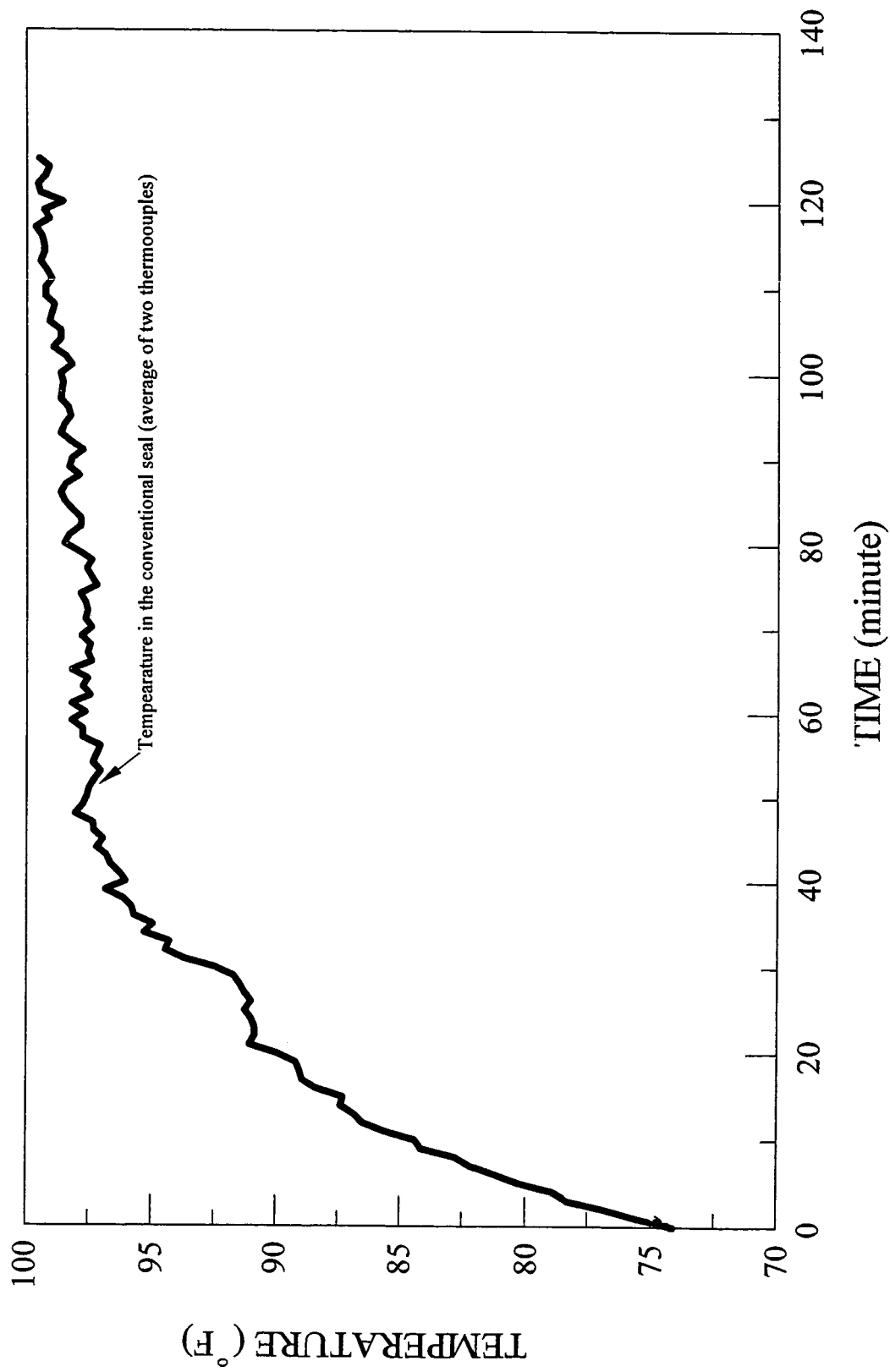
FIG. 6 is a graph plotting temperature measurements for a conventional mating ring supplied with 1.0 gpm of water coolant at room temperature as a function of time.

FIG. 6 depicts the temperature measured for the conventional mating ring supplied with 1.0 gpm of water coolant at room temperature as a function of time. The conventional mechanical seal was operated for 55 min. The temperature at the contact surface of the mating ring increased to about 96° F. after operating for approximately 55 min, and continued to increase without reaching steady state. As a result, the test was suspended because of the increasingly high probability of seal failure caused by the rising temperatures generated at the seal face.

From the above tests, several conclusions were reached. The perforated mating ring 2 was effective in reducing heat generated in the mechanical seal. The outer circumferential flow-channel 12 was effective in uniformly dispersing coolant to through-channels 6. The through-channels 6 produced four beneficial outcomes. First, the coolant flow entering the mating ring 2 and outer circumferential flow-channel 12 caused agitation and mixing, which allowed coolant to be thrown to the periphery of the through-channels 6. Second, through-channels 6 channeled coolant to a position in close proximity with the interior surface area of the seal face 4 of the mating ring 2, and the presence of the coolant in the inner diameter of the mating ring 2 was effective in substantially removing heat from the seal face 4. Third, examination of the seal face 4 and through-channels 6 showed no evidence of surface distress. Fourth, the large through-channels 6 allowed debris and contaminants to pass through the mating ring 2 without clogging, and fouling was eliminated.

The complete disclosures of all references cited in this specification are hereby incorporated by reference. In the event of an otherwise irreconcilable conflict, however, the present specification shall control.

We claim:

1. A mechanical seal comprising a mechanical housing, a seal gland, a rotating ring and a non-rotating, single-piece mating ring; wherein said seal gland is fixedly attached within said mechanical housing, with said non-rotating mating ring affixed to said seal gland; and wherein said rotating ring is fixedly attached to a shaft that is rotationally mounted within said mechanical housing; wherein:

(a) said non-rotating, single-piece mating ring comprises an inner surface and an outer surface having an outer circumferential flow-channel; wherein said outer circumferential flow-channel comprises a plurality of symmetrically-spaced through-channels that extend from said outer circumferential flow-channel to said inner surface to uniformly disperse a coolant through said mating ring in a direction perpendicular to the outer circumferential flow-channel; wherein said through-channels are sized and shaped to inhibit clogging from any debris in a coolant;

(b) when a coolant is supplied to said outer circumferential flow-channel, said outer circumferential flow-channel allows the coolant to enter said through-channels and to remove heat uniformly from said mechanical seal by removing heat from said non-rotating single-piece mating ring;

whereby heat transfer at the interface of said rotating ring and said mating ring is substantially greater than would be the heat transfer between an otherwise identical rotating ring and mating ring lacking said outer circumferential flow-channel and through-channels.

2. A mechanical seal as recited in claim 1, additionally comprising a coolant selected from the group consisting of air, nitrogen, water, ethylene glycol, propane, and lubricating oil.

3. A mechanical seal as recited in claim 1, wherein said mating ring is coated with a layer of titanium-containing amorphous hydrocarbon.

4. A mechanical seal as recited in claim 1, wherein said mating ring is fabricated from a material selected from the group consisting of stainless steel, 17-4 PH stainless steel, Ni-resist, stellite, titanium, silicon carbide, silicon nitride, and graphite composites.

5. A mechanical seal as recited in claim 1, wherein each of said through-channels has a surface area greater than about 0.007 in$^2$.

6. A mechanical seal as recited in claim 1, wherein said through-channels have an edge-to-edge spacing greater than about 0.06 in.

* * * * *